United States Patent
Cool

(10) Patent No.: US 10,502,418 B2
(45) Date of Patent: Dec. 10, 2019

(54) DEVICE AND METHOD FOR MIXING COMBUSTIBLE GAS AND COMBUSTION AIR, HOT WATER INSTALLATION PROVIDED THEREWITH, CORRESPONDING THERMAL MASS FLOW SENSOR AND METHOD FOR MEASURING A MASS FLOW RATE OF A GAS FLOW

(71) Applicant: Intergas Heating Assets BV, Coevorden (NL)

(72) Inventor: Peter Jan Cool, Lochem (NL)

(73) Assignee: INTERGAS HEATING ASSETS B.V., Coevorden (NL)

( * ) Notice: Subject to any disclaimer, the term of this patent is extended or adjusted under 35 U.S.C. 154(b) by 123 days.

(21) Appl. No.: 15/557,952

(22) PCT Filed: Mar. 17, 2016

(86) PCT No.: PCT/NL2016/050188
§ 371 (c)(1),
(2) Date: Sep. 13, 2017

(87) PCT Pub. No.: WO2016/148571
PCT Pub. Date: Sep. 22, 2016

(65) Prior Publication Data
US 2018/0058691 A1 Mar. 1, 2018

(30) Foreign Application Priority Data

Mar. 17, 2015 (NL) .................................... 2014473

(51) Int. Cl.
*F23N 1/02* (2006.01)
*F23N 5/18* (2006.01)
(Continued)

(52) U.S. Cl.
CPC .............. *F23N 1/022* (2013.01); *F23N 5/184* (2013.01); *G01F 1/684* (2013.01); *G05D 11/132* (2013.01)

(58) Field of Classification Search
CPC .... F23N 1/022; F23N 5/184; F23N 2005/181; F23N 2005/185; F23N 2900/05005;
(Continued)

(56) References Cited

U.S. PATENT DOCUMENTS

| 5,997,280 | A | * | 12/1999 | Welz, Jr. | .................. F23N 1/022 431/31 |
| 6,247,919 | B1 | * | 6/2001 | Welz, Jr. | .................. F23N 1/022 137/554 |
| 6,561,791 | B1 | | 5/2003 | Vrolijk et al. | |
| 8,636,024 | B2 | * | 1/2014 | Isetani | .................... F23N 1/005 137/486 |

(Continued)

FOREIGN PATENT DOCUMENTS

JP 2003042444 A * 2/2003
JP 2004205376 A * 7/2004

OTHER PUBLICATIONS

International Search Report and Written Opinion dated Jul. 12, 2016 for PCT/NL2016/050188.

*Primary Examiner* — Steven B McAllister
*Assistant Examiner* — Daniel E Namay

(57) ABSTRACT

A device for mixing combustible gas and combustion air, hot water installation, and corresponding thermal mass flow sensor and method. The device includes an air line, a gas line with a control valve, a first measuring line connecting the air and gas lines, and a second measuring line connecting the first measuring line to the gas and/or air line, forming a three-way intersection. A thermal mass flow sensor includes first and second temperature sensors in the first measuring line, positioned respectively in a gas flow between the three-way intersection and the air line and in a gas flow between the three-way intersection and the gas line. A controller controls the control valve based on a difference, (Continued)

measured by the flow sensor, between mass flow rate of gas between the three-way intersection and the air line and mass flow rate of gas between the three-way intersection and the gas line.

20 Claims, 9 Drawing Sheets

(51) Int. Cl.
  *G05D 11/13* (2006.01)
  *G01F 1/684* (2006.01)
  *G01F 1/688* (2006.01)
(58) Field of Classification Search
  CPC .......... F23N 1/02; F23N 5/18; F23D 2208/10; G01F 1/684; G01F 1/6842; G01F 1/688; G05D 11/132; G05D 11/13
  IPC ............... F23N 1/02,5/18; G01F 1/688; G05D 11/13
  See application file for complete search history.

(56) References Cited

U.S. PATENT DOCUMENTS

| | | | | |
|---|---|---|---|---|
| 8,640,731 | B2* | 2/2014 | Isetani | F23N 1/002 137/486 |
| 8,772,681 | B2* | 7/2014 | May | F24D 5/02 219/494 |
| 9,134,026 | B2* | 9/2015 | Blaauwwiekel | F23N 1/022 |
| 2009/0017403 | A1* | 1/2009 | Geiger | F23N 1/022 431/12 |
| 2011/0269082 | A1* | 11/2011 | Schultz | F23N 1/022 431/12 |
| 2012/0312418 | A1* | 12/2012 | Deck | G05D 11/132 141/9 |
| 2013/0302737 | A1* | 11/2013 | Schultz | F24H 3/087 431/6 |
| 2014/0080075 | A1 | 3/2014 | Young et al. | |
| 2014/0208755 | A1* | 7/2014 | Ekanayake | F15D 1/025 60/722 |
| 2015/0233578 | A1* | 8/2015 | Monteiro | F23N 3/002 431/12 |
| 2016/0298851 | A1* | 10/2016 | Brickwood | F02C 9/34 |

* cited by examiner

DEVICE AND METHOD FOR MIXING COMBUSTIBLE GAS AND COMBUSTION AIR, HOT WATER INSTALLATION PROVIDED THEREWITH, CORRESPONDING THERMAL MASS FLOW SENSOR AND METHOD FOR MEASURING A MASS FLOW RATE OF A GAS FLOW

The invention relates to a device for mixing combustible gas and combustion air for supplying to a burner. Such devices provide a gas-air mixture for burning of the combustible gas by a burner. These devices are for instance applied in hot water installations, such as a central heating boiler, boiler or geyser.

For such pre-mixed burning of a combustible gas the ratio of combustion air and the relevant gas in the mixture is controlled. The ratio of combustion air and combustible gas is chosen such that an efficient and safe burning is achieved. A stoichiometric combustion ratio with some excess air is typically chosen for the gas-air ratio. A ratio of about 10 parts air to 1 part natural gas is for instance opted for in the burning of natural gas.

U.S. Pat. No. 6,561,791 describes a device with a gas line for the supply of combustible gas and with an air line for the supply of combustion air. The gas line comprises a control valve (also referred to as "throttle valve"). A flow sensor is connected to the gas line and the air line. The control valve is controlled on the basis of the flow rate measured by the flow sensor. If the pressure in the gas line and air line is the same, the measured flow rate will equal zero. If the air pressure is however greater than the gas pressure, the sensor measures a flow from the air conduit to the gas conduit. The gas valve is in that case opened further. If the air pressure is smaller than the gas pressure, an opposite flow will be measured. The gas valve is in that case closed further.

Such a control controls the control valve so as to keep the flow rate of the gas flow through the flow sensor equal to zero. Flow sensors are generally however less accurate in the range of low fluid flow, i.e. in the measuring range around zero. The known control is therefore likewise inaccurate.

A defective flow sensor is moreover difficult to recognize in conventional devices. This is because a defective flow sensor will usually have an output of a value zero; precisely the value to which the control is adjusted. This may give the false impression that the control is functioning correctly.

It is therefore an object of the invention to provide a device for mixing combustible gas and combustion air for supplying to a burner, wherein the gas-air ratio can be controlled in accurate and reliable manner.

This object is achieved with the device according to the invention for mixing combustible gas and combustion air for supplying to a burner. In an embodiment of the device according to the invention the device comprises:
  an air line for the supply of combustion air;
  a gas line for the supply of combustible gas which is provided with a control valve;
  a first measuring line with a first outer end which is connected to the air line and a second outer end which is connected to the gas line;
  a second measuring line with a first outer end which is connected to the first measuring line at a point between the first and second outer end of the first measuring line, thus forming a three-way intersection, and with a second outer end which is connected to the gas line and/or the air line;
  a thermal mass flow sensor, comprising:
    a first temperature sensor arranged in the first measuring line and positioned such that it is situated in a gas flow between the three-way intersection and the air line during use; and
    a second temperature sensor arranged in the first measuring line and positioned such that it is situated in a gas flow between the three-way intersection and the gas line during use;
  a controller connected to the thermal mass flow sensor and the control valve and configured to control the control valve on the basis of a difference, measured by the thermal mass flow sensor, between the mass flow rate of the gas flow between the three-way intersection and the air line and the mass flow rate of the gas flow between the three-way intersection and the gas line.

Thermal mass flow sensors, also referred to as thermal flow sensors, are per se known. Thermal mass flow sensors are particularly suitable for measuring the mass flow rate of a flowing gas.

A first example of a conventional thermal mass flow sensor comprises a heating element and two temperature sensors. One of the temperature sensors is placed upstream of the heating element, while the other temperature sensor is placed downstream of the heating element. The heating element heats the fluid locally. When the fluid flows, the heat will be displaced with the flowing mass. The sensor downstream of the heating element hereby measures a higher temperature than the sensor upstream of the heating element. A direction and a mass flow rate of the fluid flow can thus be determined on the basis of the temperature difference.

Another type of thermal mass flow sensor comprises a hot wire (hot wire mass flow sensor or hot wire mass air flow (MAF) sensor). A hot wire is here placed in the gas flow for measuring. The cooling of the hot wire is a measure of the mass flow rate of the passing gas.

A further type of thermal mass flow sensor is a variant of the hot wire mass flow sensor, wherein a thermistor, for instance a PTC resistor, such as a Pt100 resistor, or an NTC resistor, is applied instead of a hot wire.

In the context of the invention mass flow rate is understood to mean the magnitude of a fluid flow expressed in mass per unit of time. In addition to a magnitude, a fluid flow also has a direction, i.e. a fluid flow is a vector quantity. The symbol $\varphi$ will be applied for a fluid flow, while the notation $|\varphi|$ will be used for the flow rate.

The thermal mass flow sensor according to the above-described embodiment comprises a first temperature sensor and a second temperature sensor which are both provided in the first measuring line. The first temperature sensor is positioned such that it is situated in a gas flow between the three-way intersection and the air line during use. The second temperature sensor is positioned such that it is situated in a gas flow between the three-way intersection and the gas line during use. The second temperature sensor is thus situated downstream of the first temperature sensor, as seen in a direction from the air line to the gas line.

The first and second temperature sensors are for instance situated on either side of the three-way intersection. The temperature sensors are for instance provided on either side of the point at which the second measuring line is connected to the first measuring line. I.e. the first temperature sensor is situated in the part of the first measuring line which extends from the three-way intersection to the air line and the second temperature sensor is situated in the part of the first measuring line which extends from the three-way intersection to the gas line. The temperature sensors can however also be placed closer together, as long as the first sensor is configured to measure a gas flow between the three-way intersection and the air line and the second sensor is configured to measure a gas flow between the three-way intersection and the gas line. The first and second sensor are for instance positioned on either side of an imaginary line at a right angle to the first measuring line which runs through the centre of the first outer end of the second measuring line.

If the gas flow in the first measuring line in the direction of the air line differs from the gas flow in the direction of the second measuring line, this difference is registered by the first and second temperature sensor. In a first example the first and second temperature sensor are embodied as a thermistor or hot wire and are each connected to a power supply so that a current runs through the thermistor or hot wire. The passing gas cools the temperature sensors, which influences the resistance of the temperature sensor. This change in resistance is registered and is a measure of the mass flow rate of the passing gas. Each sensor is for instance incorporated in a constant temperature anemometer circuit, or in a constant voltage anemometer circuit, or in a constant current anemometer circuit. In a second example a heating element is provided for heating passing gas, and a difference in the temperature measured by the first and second temperature sensor is a measure of the difference in gas flow to respectively the air line and the gas line.

The three-way intersection is formed in that the first measuring line is connected to the second measuring line. In other words, the three-way intersection is provided with one inlet and two outlets or with one outlet and two inlets. In the first case the two outlets are connected to the air line and the gas line. In the second case the two inlets are connected to the air line and the gas line.

The gas flow between the three-way intersection and the air line can thus be directed both from the three-way intersection to the air line and vice versa. The gas flow between the three-way intersection and the gas line can moreover be directed both toward the gas line and vice versa. The gas flow between the three-way intersection and the gas line in any case has a direction opposite to the direction of the gas flow between the three-way intersection and the air line.

The thermal mass flow sensor is connected to a controller which can in this way control the control valve on the basis of the measured difference in mass flow rate. If a difference is detected, the pressure in gas line and air line differs, and the control valve is controlled so as to correct this.

In conventional systems, in which no second measuring line is provided, the control valve is controlled so that no flow takes place through the first measuring line. In the device according to the invention the control valve is however controlled so that a flow does result in the first measuring line. Because flow sensors are less accurate in the range of low fluid flow, the invention can measure the pressure difference between the gas line and air line more accurately than conventional systems. A less accurate sensor can if desired suffice for the device according to the invention.

A further advantage of the invention is that a defective sensor can be recognized more easily. In conventional systems a defective sensor can have an output of a value zero, while flow does in fact take place from the gas line to the air line or vice versa. Due to the presence of the second measuring line a gas flow is still present in the first measuring line when the pressure in the air line and the gas line is equal. In the undesirable event that the sensor has an output of zero mass flow rate, it will be immediately apparent that there is a defect.

A further advantage of the invention is that, because a second measuring line is provided, the total flow rate of air and/or gas can if desired be determined without a separate sensor having to be provided for the purpose. This determination will be elucidated hereinbelow. The first measuring line and the second measuring line form a three-way intersection. Three fluid flows can be defined. The first fluid flow $\varphi_1$ is defined as a flow in the first measuring line, from the three-way intersection to the air line. The second fluid flow $\varphi_2$ is defined as a flow in the first measuring line, from the three-way intersection to the gas line. The second fluid flow $\varphi_2$ has a direction opposite to the first fluid flow $\varphi_1$. The third fluid flow $\varphi_3$ is defined as a flow in the second measuring line, from the measuring line to the three-way intersection. Since the quantity of gas flowing into the three-way intersection must be equal to the quantity of gas flowing out of the three-way intersection, it is the case that $\varphi_1+\varphi_2=\varphi_3$. The mass flow rate of fluid flow $\varphi_1$ and of fluid flow $\varphi_2$ can be determined on the basis of the measurement by the first and/or second temperature sensor. $\varphi_3$ can then be calculated on the basis of $\varphi_1$ and $\varphi_2$, for instance as the sum of $\varphi_1$ and $\varphi_2$.

Since the controller controls the gas valve so that $|\varphi_1|=|\varphi_2|$, the mass flow rate $|\varphi_3|$ can if desired be determined as $|\varphi_3|=2*|\varphi_1|$ or $|\varphi_3|=2*|\varphi_2|$, although such a determination will generally be less accurate than the determination on the basis of the sum of $\varphi_1$ and $\varphi_2$.

In other words, in conventional systems with only one measuring line only one quantity can be measured, while in the invention at least two quantities can be measured: a difference in fluid flow which is indicative of a pressure difference between the gas line and air line, and a sum of fluid flows which is indicative of a total flow rate.

In a burner the conductivity of the flame is used to measure whether burning actually takes place. It is also possible on the basis of the conductivity to check whether the burning is correct, for instance whether the burning takes place with sufficient excess oxygen. This is therefore of great importance for the safety of the installation in question. The flame current which is measured however also depends on the load, i.e. the magnitude of the gas flow. Because the invention enables the total flow rate of the gas flow to be measured, the anticipated flame current can be determined and be used to monitor the correct functioning of the appliance.

A further advantage of the invention is that the control can be performed electronically.

The thermal mass flow sensor is for instance calibrated before the device is set into operation. The calibration preferably takes place when the device is switched off, at least when no gas and air flows take place in the device. The processing unit for instance determines the mass flow rate through the second measuring line on the basis of at least one of the value measured by the first temperature sensor and the value measured by the second temperature sensor, and calibration data and/or a sensor characteristic.

In a preferred embodiment the first temperature sensor and the second temperature sensor are each provided in a circuit for constant temperature anemometry. The first temperature sensor and second temperature sensor are preferably embodied as a thermistor, a hot wire sensor or a hot film sensor (also known as a hot film probe).

Such a circuit is configured to keep the temperature of the temperature sensor, and therefore its resistance, constant by controlling the flow through the sensor. This is for instance realized with a feedback loop, for instance on the basis of an amplifier in combination with a Wheatstone bridge. A voltage over the temperature sensor provides for a current through the sensor, whereby the temperature sensor heats up. When the temperature sensor, such as a PTC thermistor or a hot wire, cools off due to a passing gas, the feedback circuit will apply more power in order to keep the temperature sensor at the same temperature. This can be measured at the output of the circuit.

Alternatively, the first temperature sensor and the second temperature sensor are each provided in a circuit for constant voltage anemometry or constant current anemometry. In another preferred embodiment the thermal mass flow sensor further comprises a heating element arranged in the first measuring line and situated at or close to the three-way intersection, wherein the first temperature sensor is situated upstream of the heating element and the second temperature sensor is situated downstream of the heating element, as seen in a direction from the air line to the gas line, wherein the controller is configured to control the control valve on the basis of a difference between the temperature measured by the first temperature sensor and the temperature measured by the second temperature sensor.

The first and second temperature sensor are preferably placed at substantially the same distance from the heating element, so that the temperature difference measured between the sensors equals zero in the absence of a flow through the measuring line, from the gas line to the air line or vice versa. If the two temperature sensors have different distances to the heating element, the control can compensate herefor.

In an embodiment the device comprises a processing unit which is operatively connected to the thermal mass flow sensor and is configured to determine a mass flow rate through the second measuring line on the basis of the values output by the first temperature sensor and the second temperature sensor.

The processing unit and the controller can be integrated. In other words, instead of a separate processing unit, the controller can be configured to both control the control valve and determine the mass flow rate through the second measuring line, i.e. calculate the mass flow rate through the second measuring line.

In a further preferred embodiment according to the invention the thermal mass flow sensor comprises a third temperature sensor situated on a side of the heating element facing toward the second measuring line, and the processing unit is configured to determine the mass flow rate through the second measuring line on the basis of the values output by the first, second and third temperature sensor.

The total flow rate through the second measuring line can be determined more accurately by providing a third temperature sensor. A flow $\varphi_3$ is for instance defined as a flow from the second measuring line to the three-way intersection. According to this definition, the third temperature sensor is situated upstream relative to the heating element in flow direction $\varphi_3$, while the first and second temperature sensors are situated downstream relative to the heating element. In the case of a positive flow, i.e. a flow in the direction as defined above, the first and second temperature sensors will measure a higher temperature than the third temperature sensor. Similarly, in the case of a negative flow, i.e. a flow from the three-way intersection to the second measuring line, the third temperature sensor will measure a higher temperature than the first and second temperature sensors. The total flow rate through the second measuring line is therefore related to the difference between the temperature measured by the third temperature sensor and the temperature measured by the first and/or second temperature sensor. This difference is for instance determined as: $\Delta T = T_1 + T_2 - 2*T_3$ or as $\Delta T = (T_1+T_2)/2 - T_3$, wherein $T_i$ is the temperature of the $i^{th}$ temperature sensor. Based on a linear relation between flow rate and temperature difference, it is then the case that: $|\varphi_3| = |\Delta T|*C$, with C representing a constant.

The first, second and third temperature sensor are preferably arranged in the same plane.

The thermal mass flow sensor is preferably embodied as a microsensor, for instance as a thin film sensor.

According to the invention, the second measuring line can be configured in different ways. In a first and second embodiment the second measuring line is connected to the gas line, while in a third and fourth embodiment the second measuring line is connected to the air line.

In the first embodiment the second outer end of the second measuring line is connected to the gas line at a point situated upstream relative to the point at which the first measuring line is connected to the gas line, as seen in the direction of flow of the combustible gas through the gas line.

In this embodiment the flow rate flowing through the second measuring line is a measure of the inflow of combustible gas into the device. Because of the invention it is therefore possible to determine the magnitude of the gas flow. The anticipated flame current can be determined on the basis of this gas flow rate, so that it is possible to accurately monitor whether correct burning takes place.

In the second embodiment the second outer end of the second measuring line is connected to the gas line at a point situated downstream relative to the point at which the first measuring line is connected to the gas line, as seen in the direction of flow of the combustible gas through the gas line.

The flow directions are reversed relative to the first embodiment. In this embodiment the flow in the second measuring line is however also a measure of the gas flow. The pressure is likewise controlled in similar manner on the basis of a difference between a first flow $\varphi_1$ from the air line to the three-way intersection and a second flow $\varphi_2$ from the three-way intersection to the gas line.

In the first or second embodiment the gas line preferably comprises a flow restriction between the point at which the first measuring line is connected to the gas line and the point at which the second measuring line is connected to the gas line.

It is achieved with the flow restriction, for instance a narrowing, that a sufficiently large flow flows through the second measuring line. I.e. the value of $\varphi_3$ is sufficiently high to enable a reliable measurement of the gas flow to be performed.

In the third embodiment the second outer end of the second measuring line is connected to the air line at a point situated upstream relative to the point at which the first measuring line is connected to the air line, as seen in the direction of flow of the combustion air through the air line.

In the third embodiment the flow rate flowing through the second measuring line is a measure of the flow rate of the inflow of combustion air into the device. Because of the invention it is therefore possible to determine the magnitude of the air flow.

In the fourth embodiment the second outer end of the second measuring line is connected to the air line at a point situated downstream relative to the point at which the first measuring line is connected to the air line, as seen in the direction of flow of the combustion air through the air line.

As in the third embodiment, the magnitude of the air inlet can be determined in this way.

In the third and fourth embodiment the air line preferably comprises a flow restriction between the point at which the first measuring line is connected to the air line and the point at which the second measuring line is connected to the air line.

The reliability of the measurement is increased in that the flow restriction ensures a sufficiently large air flow through the second measuring line.

In a fifth embodiment the second outer end of the second measuring line is connected to both the gas line and the air line, downstream of the point at which the first measuring line is connected to the air line and downstream of the point at which the first measuring line is connected to the gas line.

In this situation the flow rate of the flow through the second measuring line is a measure of the sum of the gas and air flow rate. The flow rate of a gas-air mixture inflow is therefore determined in this configuration.

In the fifth embodiment the air line preferably comprises a first flow restriction situated downstream of the point at which the air line is connected to the first measuring line, as seen in the direction of flow of air through the air line, and the gas line comprises a second flow restriction situated downstream of the point at which the gas line is connected to the first measuring line, as seen in the direction of flow of gas through the gas line.

The reliability of the measurement of the flow rate of the inflow of the gas-air mixture is increased in this way, since the flow restrictions enhance the inflow of gas and air into the second measuring line.

In a sixth embodiment the gas line comprises a shut-off valve upstream of the control valve, and the second outer end of the second measuring line is connected to the gas line at a point situated between the control valve and the shut-off valve.

In this configuration the flow rate of the flow through the second measuring line is a measure of the difference in the gas supply pressure ($P_{gas\_supply}$) and the gas pressure downstream of the control valve ($P_{gas}$).

The shut-off valve can for instance be switched from a closed to an open situation by the controller. It is otherwise noted that a shut-off valve can in other embodiments also be provided in addition to the control valve.

In the sixth embodiment the air line optionally comprises a flow restriction situated downstream of the point at which the air line is connected to the first measuring line, as seen in the direction of flow of air through the air line.

In a further preferred embodiment the thermal mass flow sensor comprises at least one further temperature sensor and/or heating element.

The accuracy of the measurements can be increased by providing a plurality of temperature sensors. Because measuring takes place with a plurality of sensors, measurement errors can be reduced. If the value measured by a determined sensor differs greatly from the value measured by nearby sensors, this sensor can for instance be ignored during the calculation.

By providing a plurality of heating elements each temperature sensor can be placed at the same distance from a heating element, so that substantially the same relation between measured temperature and fluid flow can be applied in each case.

The invention further relates to a hot water installation comprising a device as described above. The same advantages and effects as described above in relation to the device according to the invention also apply to such a hot water installation.

The invention further relates to a thermal mass flow sensor, comprising:
 a heating element; and
 a first, a second and a third temperature sensor, wherein the first and second temperature sensor are arranged on either side of the heating element and are arranged in one line with the heating element in a first direction, and wherein the third temperature sensor is arranged in one line with the heating element in a second direction, which differs from the first direction that preferably lies substantially transversely of the second direction.

Such a mass flow sensor is particularly suitable for use in the device according to the invention. The mass flow sensor according to the invention can however also be used for other applications.

In a preferred embodiment the thermal mass flow sensor comprises at least one further temperature sensor and/or heating element.

In a further preferred embodiment the thermal mass flow sensor comprises at least two temperature sensors arranged adjacently of each other on the same side of the heating element and at substantially the same distance from the heating element.

Since they are placed on the same side of the heating element and moreover at the same distance from the heating element, the two temperature sensors measure substantially the same temperature. The temperature can therefore be accurately determined by taking an average of the temperatures measured by these two sensors.

In a preferred embodiment the heating element and the temperature sensors are arranged in a grid.

In other words, the thermal mass flow sensor is embodied as a matrix sensor. The sensor is hereby able to accurately measure fluid flows (gas or liquid). When a fluid flow is measured with conventional sensors only the local flow is measured. A flow however generally varies as a function of position. In a pipe the flow along the wall will for instance differ from the flow in the centre of the pipe. The matrix sensor according to the invention enables such a flow profile to be measured.

The thermal mass flow sensor is preferably a thin film sensor.

The sensor according to the invention is for instance produced by applying a thin film to a substrate. The substrate is for instance of a material with low thermal conductivity, for instance a ceramic material. An electronic structure is then arranged on the thin film, wherein the measuring resistors and the heating resistors are formed. This can for instance be realized by etching of the thin film layer or by means of another known technology for chip production.

The invention further relates to a method for controlling a device for mixing a combustible gas and combustion air for supplying to a burner, the device comprising:
 an air line for the supply of combustion air;
 a gas line for the supply of a combustible gas provided with a control valve;
 a first measuring line with a first outer end which is connected to the air line and a second outer end which is connected to the gas line; and
 a second measuring line with a first outer end which is connected to the first measuring line at a point between the first and second outer end of the first measuring line, thus forming a three-way intersection, and with a second outer end which is connected to the gas line and/or the air line, the method comprising of:
measuring a mass flow rate of a gas flow between the three-way intersection and the air line;
measuring a mass flow rate of a gas flow between the three-way intersection and the gas line;
opening the control valve if the mass flow rate of the gas flow between the three-way intersection and the gas line is a predetermined first threshold value smaller than the gas flow between the three-way intersection and the air line; and
closing the control valve if the mass flow rate of the gas flow between the three-way intersection and the gas line is a predetermined second threshold value greater than the gas flow between the three-way intersection and the air line.

The control valve can be opened to greater or lesser extent. "Opening the control valve" and "closing the control valve" are therefore also understood to mean "further opening the control valve" and "further closing the control valve".

The first threshold value and/or second threshold value is preferably set at zero for a 1:1 ratio between the mass flow rate of the gas flow between the three-way intersection and the air line and the mass flow rate of the gas flow between the three-way intersection and the gas line.

The invention further relates to a method for measuring a mass flow rate of a gas flow in a device for mixing combustible gas and combustion air for supplying to a burner, the device comprising:
an air line for the supply of combustion air;
a gas line for the supply of a combustible gas provided with a control valve;
a first measuring line with a first outer end which is connected to the air line and a second outer end which is connected to the gas line;
a second measuring line with a first outer end which is connected to the first measuring line at a point between the first and second outer end of the first measuring line, thus forming a three-way intersection, and with a second outer end which is connected to the gas line and/or the air line;
a thermal mass flow sensor, comprising:
a first temperature sensor arranged in the first measuring line and positioned such that it is situated in a gas flow between the three-way intersection and the air line during use; and
a second temperature sensor arranged in the first measuring line and positioned such that it is situated in a gas flow between the three-way intersection and the gas line during use,
the method comprising of:
determining the mass flow rate through the second measuring line on the basis of at least one of the value output by the first temperature sensor and the value output by the second temperature sensor.

The same advantages and effects as described above in relation to the device according to the invention also apply to the above stated methods. The methods can particularly be applied in combination with a device according to the invention.

The value which is output by the first and second temperature sensor is for instance indicative of a temperature, for instance a voltage value or current value which is indicative of the temperature. In another example the first and second temperature sensor have an output of a value which is indicative of a flow velocity or the mass flow rate, for instance a voltage value or current value which is indicative of the flow velocity or the mass flow rate.

Further advantages, features and details of the invention are elucidated on the basis of preferred embodiments thereof, wherein reference is made to the accompanying drawings.

Figure 1A:
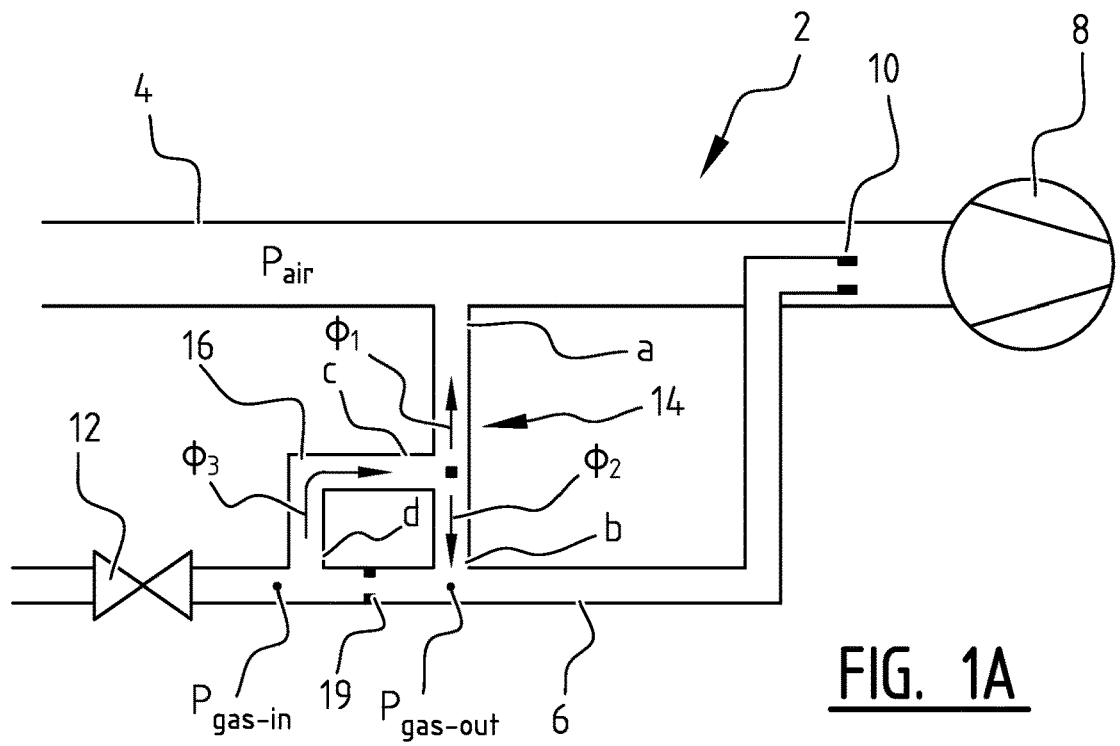
FIG. 1A shows schematically a first exemplary embodiment of a device according to the invention.
Figure 1B:
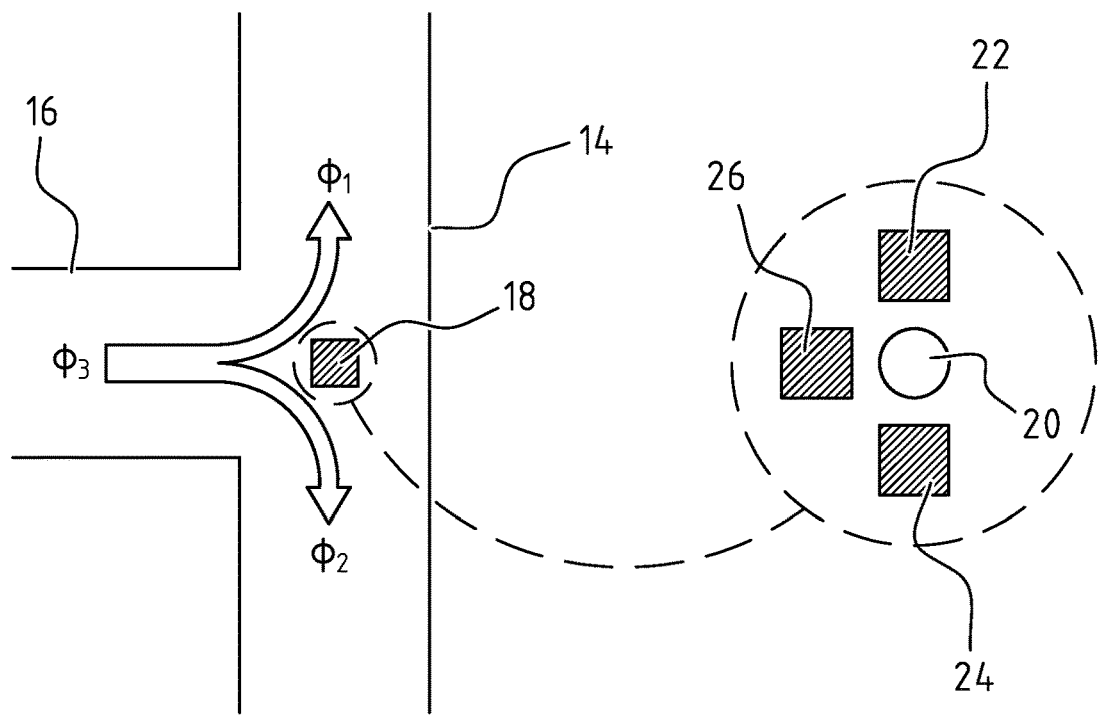
FIG. 1B shows in detail the thermal mass flow sensor for the device of FIG. 1A.
Figure 2A:
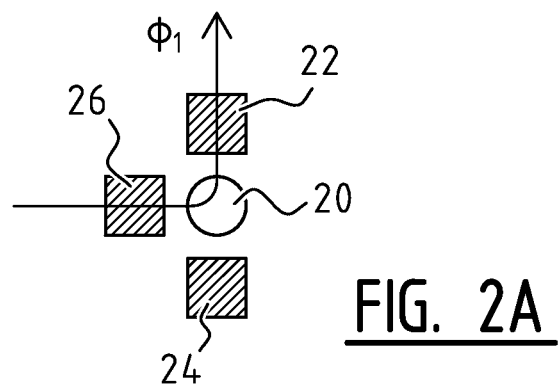
Figure 2B:
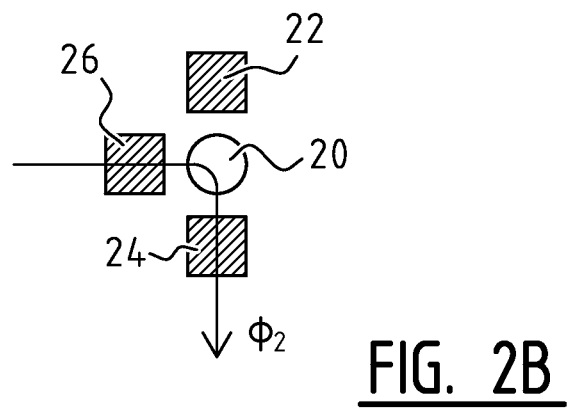
Figure 2C:
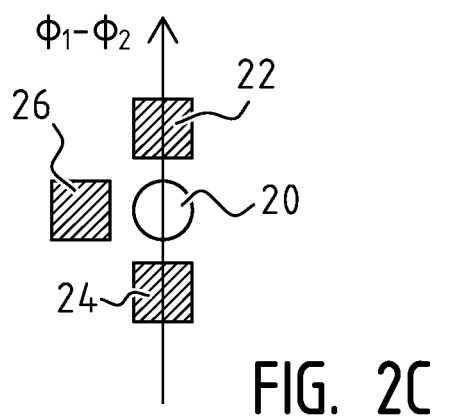
Figure 3A:
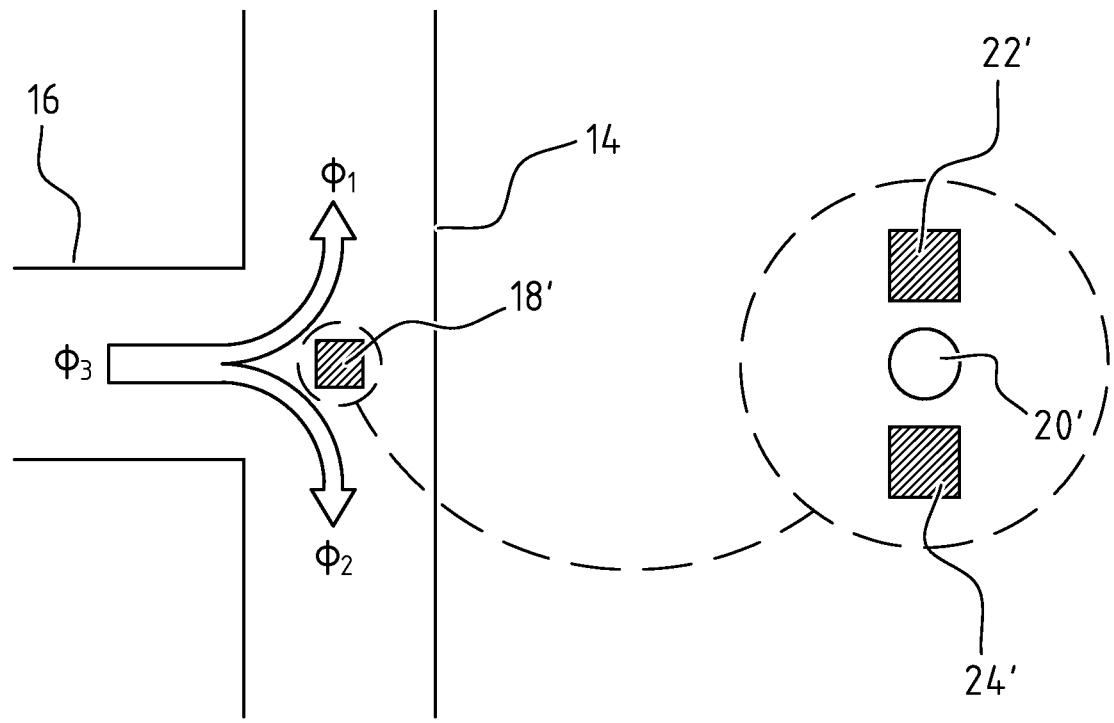
Figure 4:
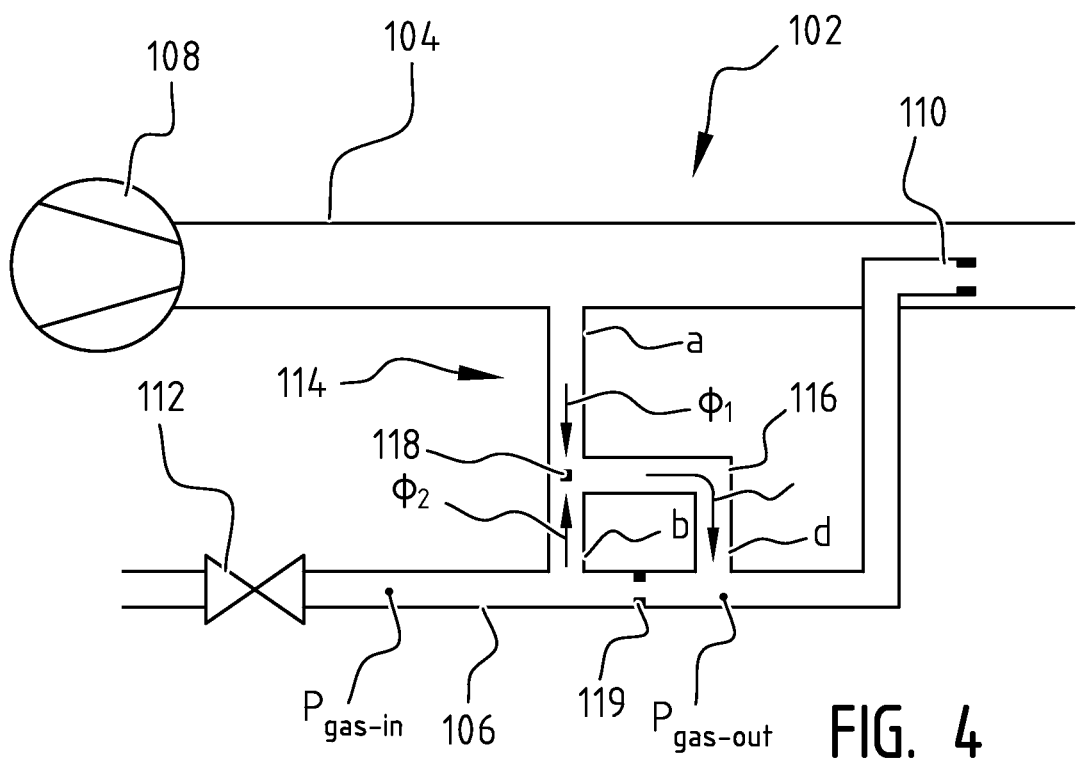
Figure 3B:
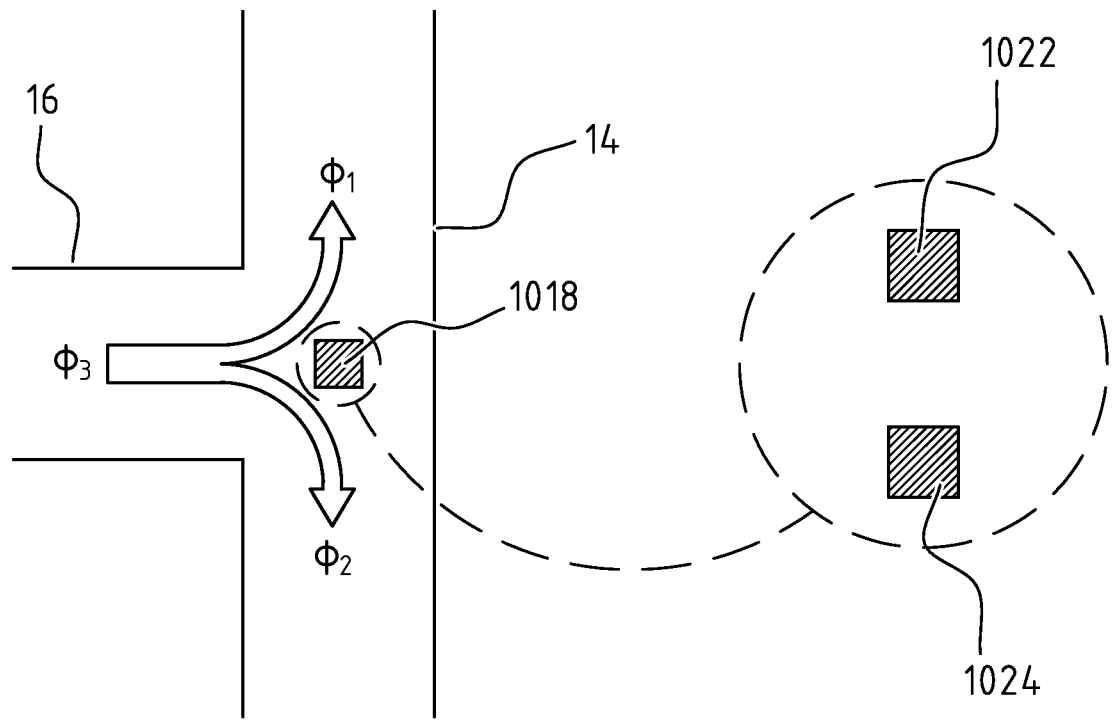
Figure 3D:
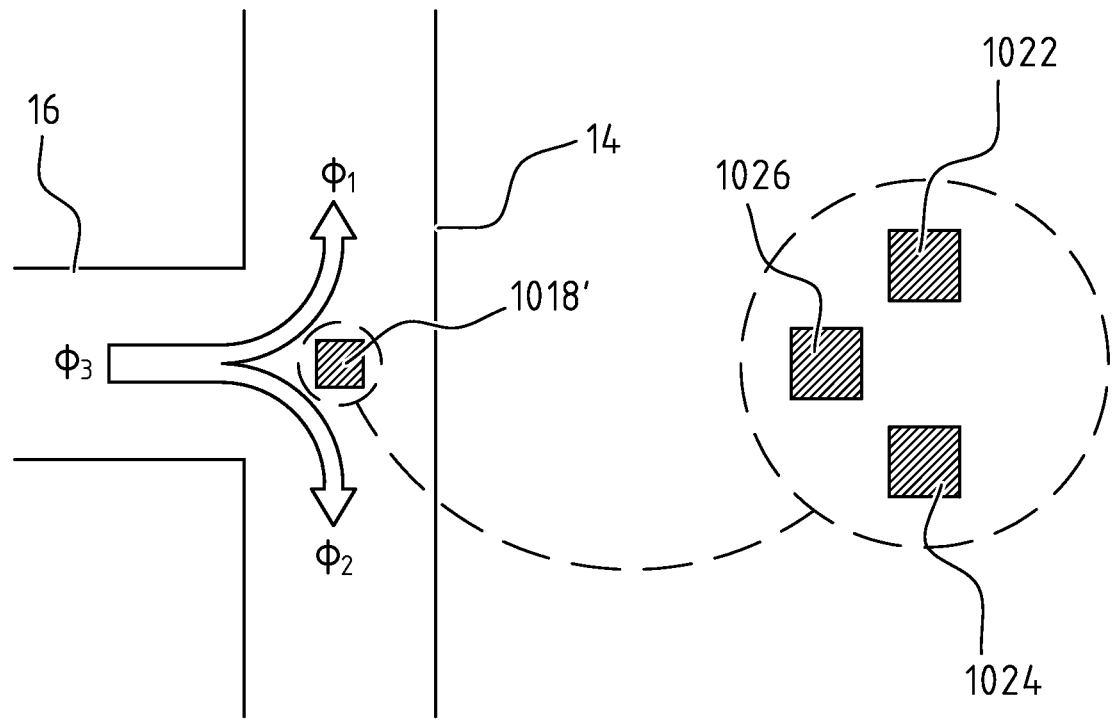
Figure 3C:
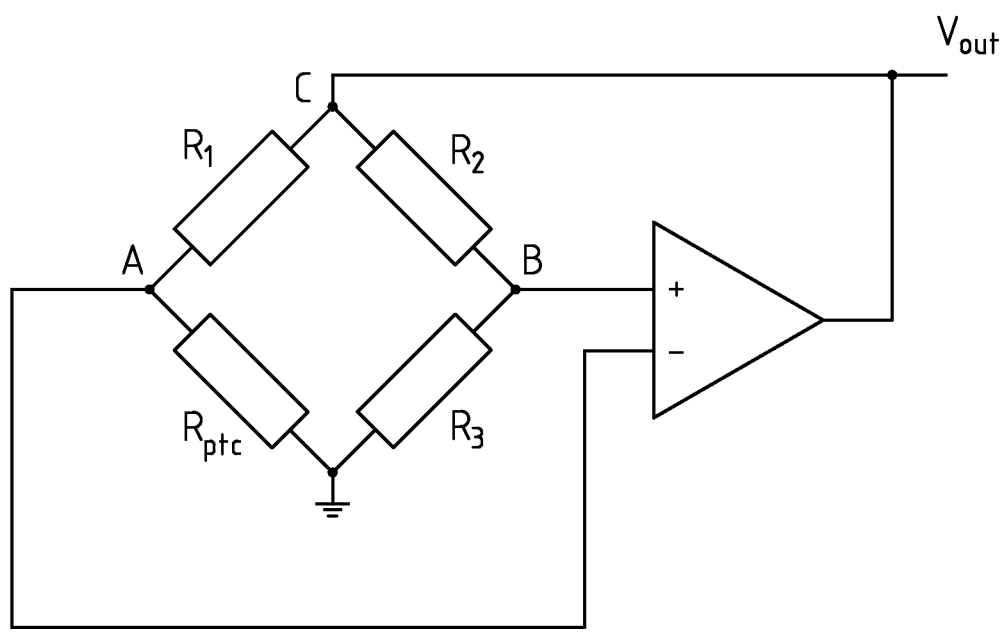
Figure 5:
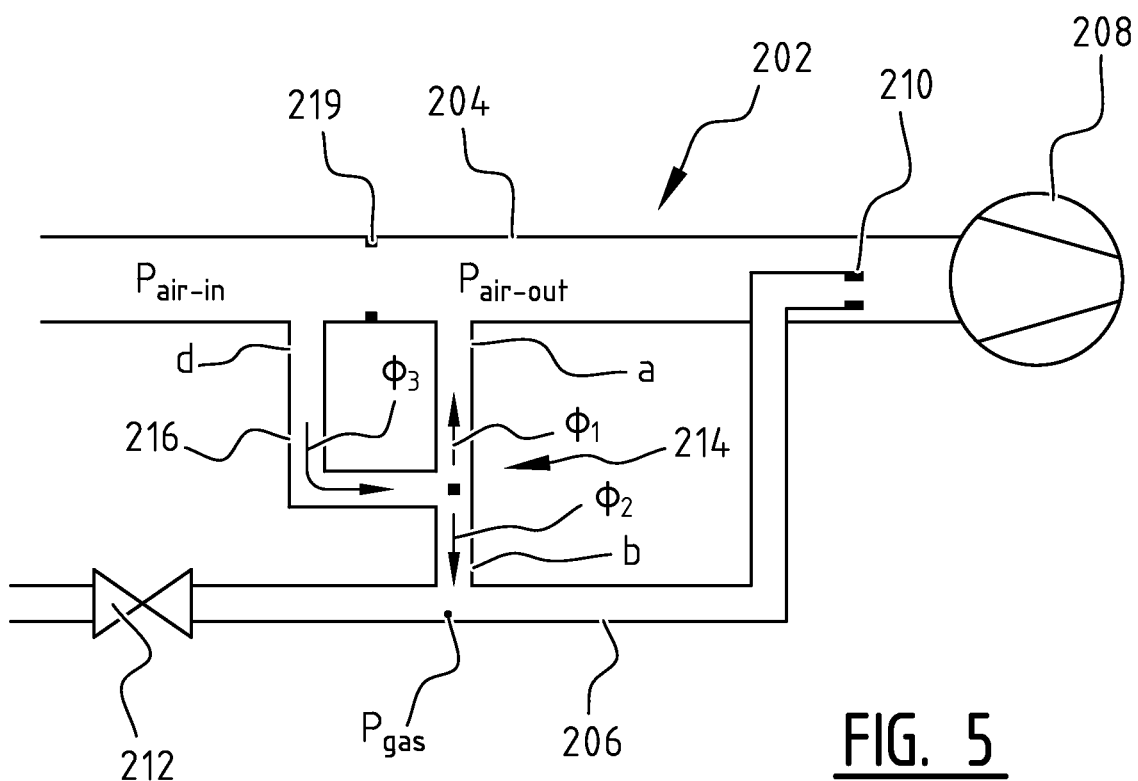
Figure 6:
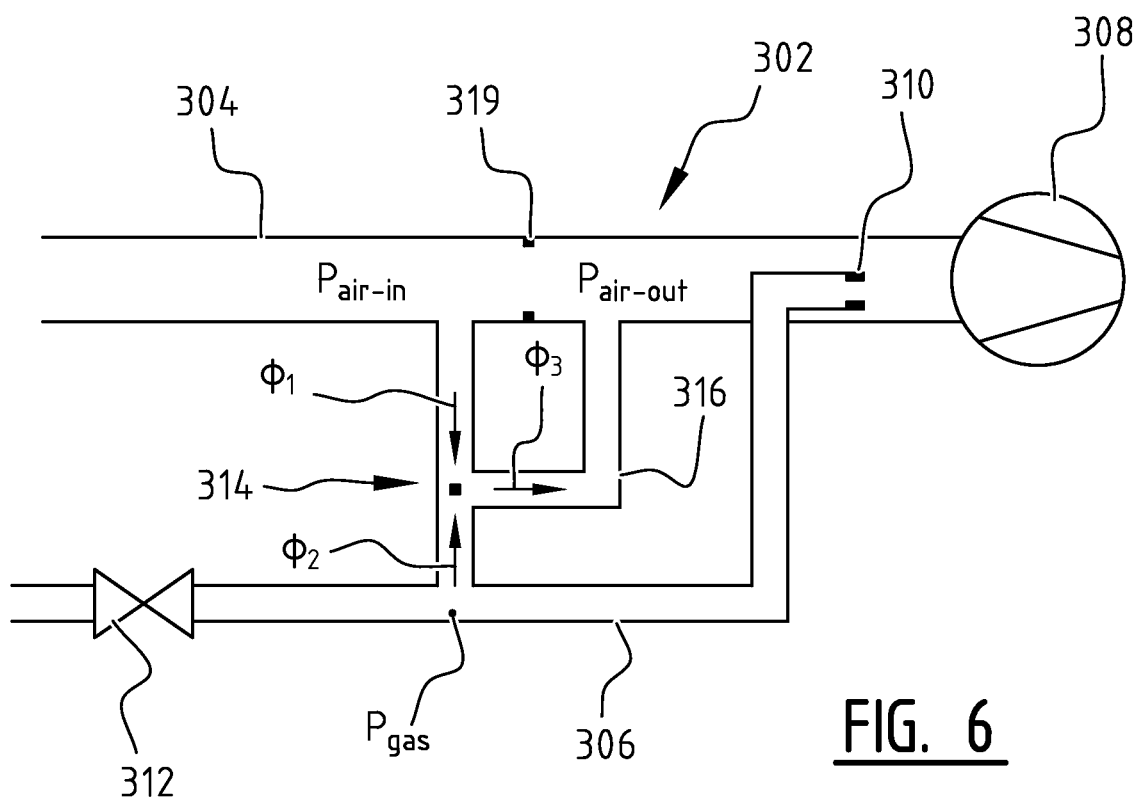
Figure 7:
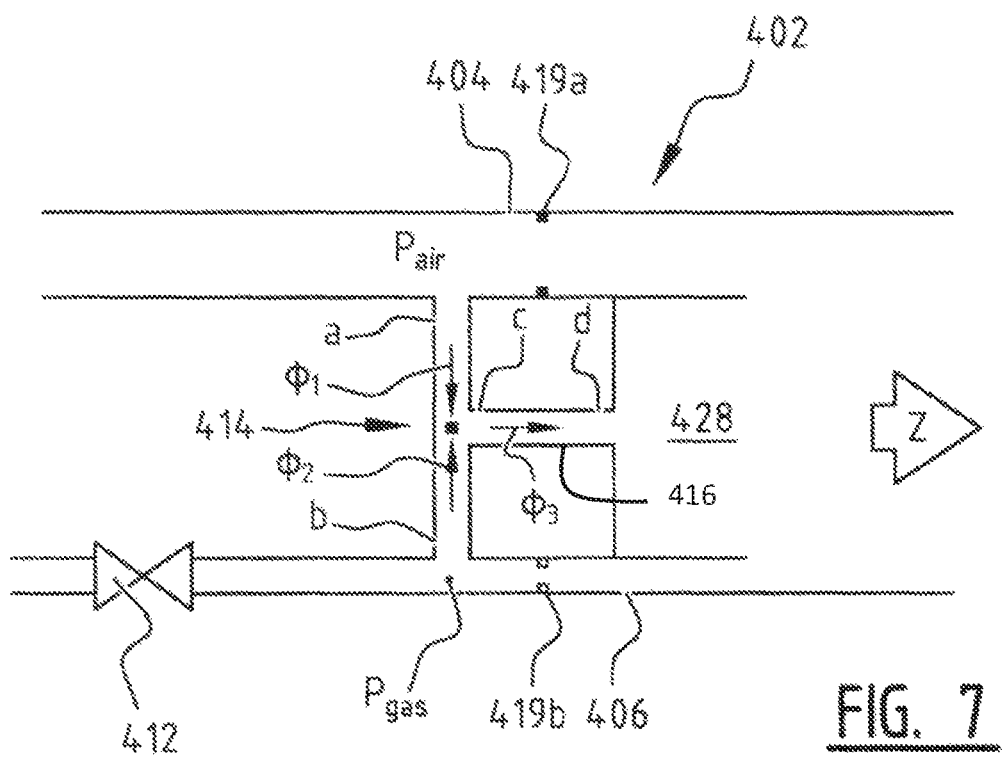
Figure 8:
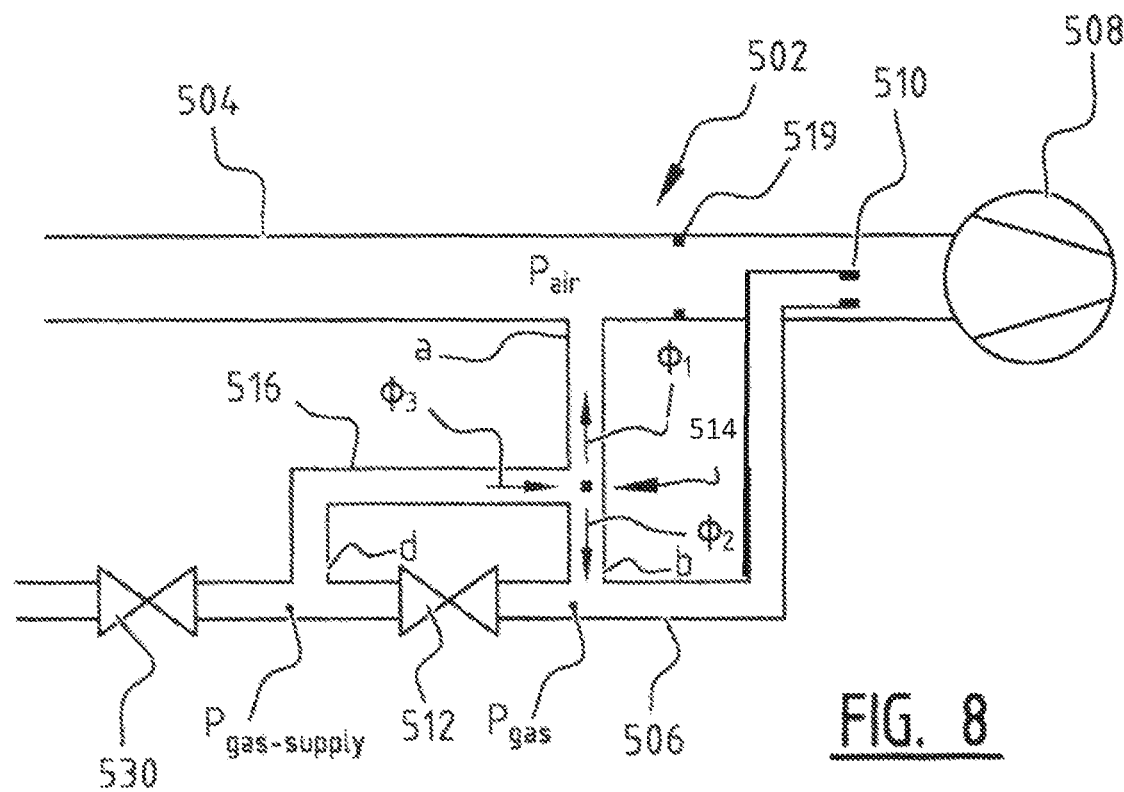
Figure 9A:
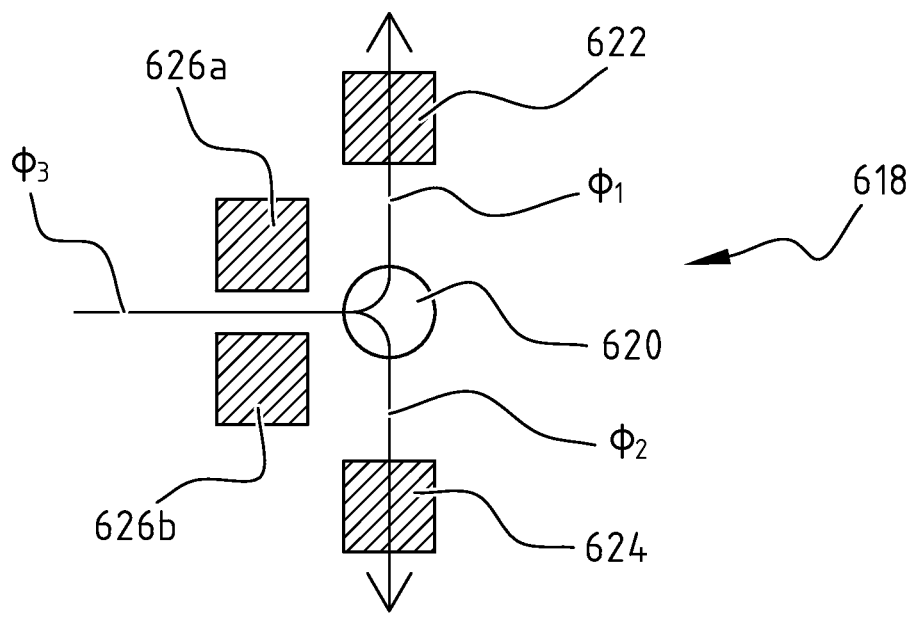
Figure 9B:
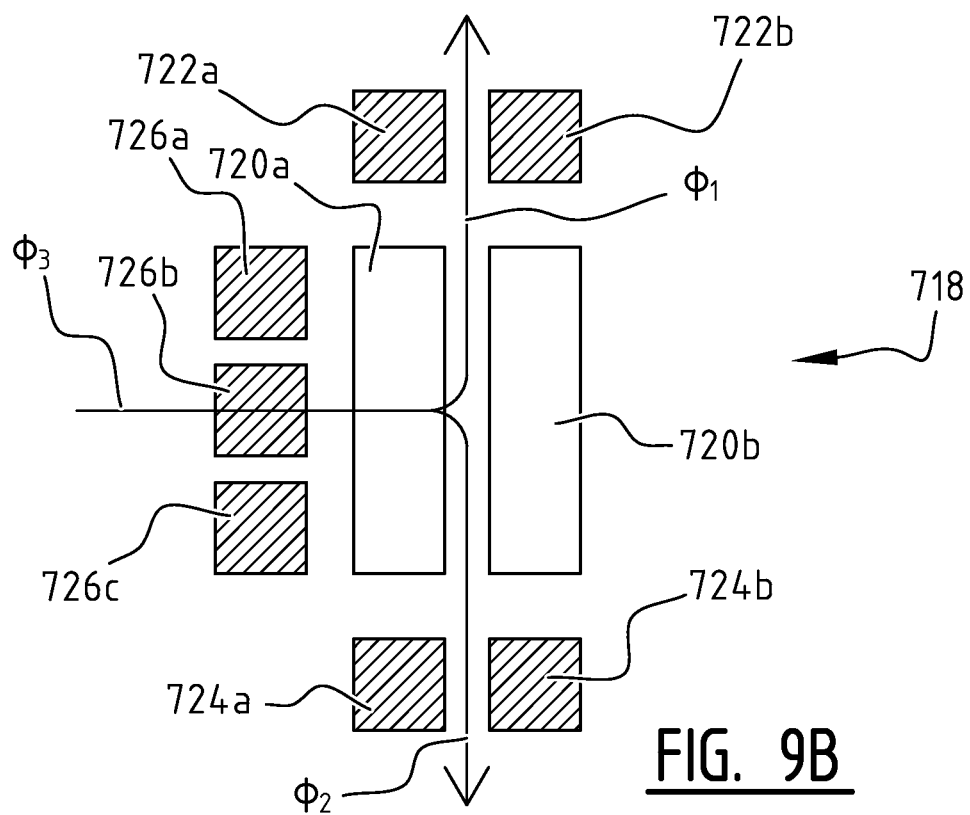
Figure 9C:
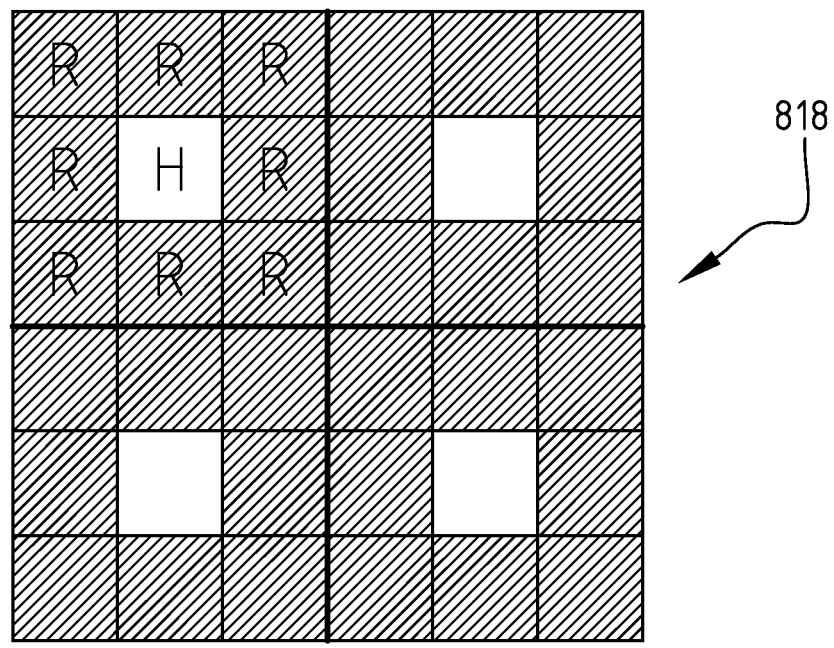
Figure 9D:
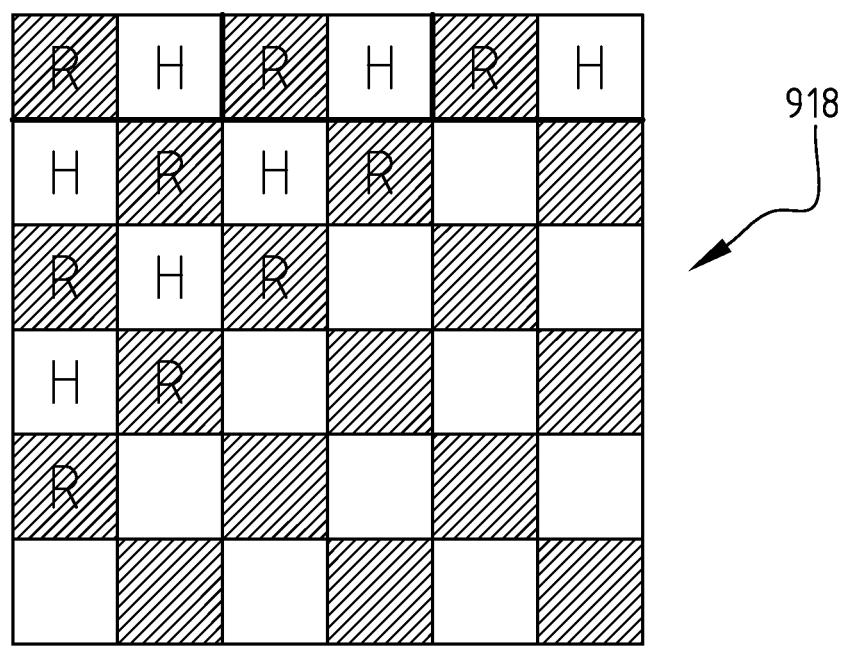

FIGS. 2A-C illustrate the measuring of different fluid flows along the sensor of FIG. 1B;

FIG. 3A shows schematically a second embodiment of a thermal mass flow sensor for the device of FIG. 1A;

FIG. 3B shows schematically a third embodiment of a thermal mass flow sensor for the device of FIG. 1A;

FIG. 3C shows a circuit for a temperature sensor of the mass flow sensor of FIG. 3B;

FIG. 3D shows schematically a fourth embodiment of a thermal mass flow sensor for the device of FIG. 1A;

FIG. 4 shows schematically a second exemplary embodiment of a device according to the invention;

FIG. 5 shows schematically a third exemplary embodiment of a device according to the invention;

FIG. 6 shows schematically a fourth exemplary embodiment of a device according to the invention;

FIG. 7 shows schematically a fifth exemplary embodiment of a device according to the invention;

FIG. 8 shows schematically a sixth exemplary embodiment of a device according to the invention;

FIGS. 9A-B show schematically a second and third exemplary embodiment of a thermal mass flow sensor according to the invention; and FIGS. 9C-D show schematically a fourth and fifth exemplary embodiment of a thermal mass flow sensor according to the invention, wherein the sensor is embodied as a matrix of heating elements and temperature sensors.

Referring to the FIGS., device 2, 102, 202, 302, 402, 502 comprises an air line 4, 104, 204, 304, 404, 504 and a gas line 6, 106, 206, 306, 406, 506. Air is drawn in via air line 4, 104, 204, 304, 404, 504 by means of fan 8, 108, 208, 308, 508. Natural gas is moreover supplied via gas line 6, 106, 206, 306, 406, 506. Gas line 6, 106, 206, 306, 406, 506 is provided with a control valve 12, 112, 212, 312, 412, 512. Gas line 6, 106, 206, 306, 406, 506 debouches into air line 4, 104, 204, 304, 404, 504 for the purpose of mixing the gas with the air. Gas line 6, 106, 206, 306, 406, 506 optionally comprises at the outer end a nozzle 10, 110, 210, 310, 510 which debouches into air line 4, 104, 204, 304, 404, 504. A flow restriction 19, 119, 319, such as a narrowing, may be arranged in the air line or gas line. For example, referring to FIG. 1A, device 2 comprises an air line 4 and a gas line 6. Air is drawn in via air line 4 by means of fan 8. Natural gas is moreover supplied via gas line 6. Gas line 6 is provided on the infeed side with a control valve 12. Gas line 6 debouches into air line 4 for the purpose of mixing the gas with the air. Gas line 6 optionally comprises at the outer end a nozzle 10 which debouches into air line 4.

Air line 4 is connected to gas line 6 via a first measuring line 14. The one outer end a of measuring line 14 is connected for this purpose to air line 4, while the other outer end b is connected to gas line 6. A second measuring line 16 is connected with its one outer end c to measuring line 14, while its other outer end d is connected to gas line 6. The outer end d of measuring line 16 is situated upstream of outer end b of measuring line 14, as seen in the direction of flow of the gas through gas line 6.

Because the outer end c of measuring line 16 is coupled to measuring line 14 at a point between the outer ends a and b of measuring line 14, a three-way intersection (also referred to as T-junction) is formed. A thermal mass flow sensor 18 is positioned at the three-way intersection (FIG. 1B).

A flow restriction 19, such as a narrowing, is arranged in the gas line between outer end b of measuring line 14 and outer end d of measuring line 16.

Control valve 12 is controlled by a controller (not shown) on the basis of the fluid flows measured by sensor 18. Sensor 18 measures the magnitude of fluid flow $\varphi_1$ which flows from the three-way intersection to air line 4. Sensor 18 moreover measures the magnitude of the fluid flow $\varphi_2$ which flows from the three-way intersection to gas line 4. The magnitude of the fluid flow is determined by sensor 18 in the form of a mass flow rate of the flow, for instance expressed in kg/s. The output of sensor 18 is for instance a voltage or current which is indicative of the mass flow rate of the relevant gas flow $\varphi_1$, $\varphi_2$.

Sensor 18 comprises in this example a heating element 20, for instance in the form of a resistor or hot wire. Three temperature sensors 22, 24, 26 are arranged around heating element 20. Temperature sensors 22, 24 are situated on either side of heating element 20. Temperature sensor 22, heating element 20 and temperature sensor 24 thus lie in one line, at least substantially in one line, in measuring line 14. The third temperature sensor 26 is positioned on the side of second measuring line 16 relative to heating element 20. It is recommended to place temperature sensors 22, 24, 26 at substantially the same distance from heating element 20, as shown in the example. If they are alternatively placed at different distances, this has to be corrected for in the processing of the values measured by sensors 22, 24, 26.

Temperature sensors 22, 24, 26 can for instance the thermistors, such as PTC or NTC thermistors.

Heating element 20 is supplied with a predetermined power, preferably a constant power. The heat produced by heating element 20 is in this way known. If no flow of gas takes place, the heat is distributed evenly and temperature sensors 22, 24, 26 measure the same temperature. If flow of a gas (natural gas, air or a natural gas-air mixture) however takes place through measuring lines 14, 16, the heat is distributed by that gas and temperature differences result. The mass flow rate and the direction of fluid flow through the three-way intersection can therefore be determined on the basis of the temperature measured by sensors 22, 24, 26.

The mass flow rate of the gas flow $\varphi_1$ in the direction of air line 4 is proportional to the difference in temperature measured by sensor 22 and sensor 26 (FIG. 2A). If use is for instance made of a constant heating power of heating element 20, it is the case in a linear approximation that: $\varphi_1=C^*(T_{22}-T_{26})$, with C representing a constant. Similarly, it is the case that $\varphi_2=C^*(T_{24}-T_{26})$ (see FIG. 2B). To calculate the total fluid flow $\varphi_3$ flowing into the three-way intersection it is the case that: $\varphi_3=\varphi_1+\varphi_2=C^*(T_{22}+T_{24}-2^*T_{26})$.

By controlling control valve 12 with the controller, the pressure $P_{air}$ (FIG. 1A) and pressure $P_{gas\_out}$ (FIG. 1A) are kept equal to each other. In the case of equal pressure it is the case that $\varphi_1=\varphi_2$. Whether the pressure is indeed equal is measured by determining the difference in temperature between temperature sensor 22 and temperature sensor 24. FIG. 2C illustrates a situation in which the pressure is unequal, so that the gas flows in the direction from sensor 24 to sensor 22. Sensor 22 will then detect a higher temperature than sensor 24. The controller therefore controls control valve 12 on the basis of the difference in temperature between sensor 22 and sensor 24.

The gas flow $\varphi_3$ through the second measuring line 16 is correlated to the flow through gas line 6 and depends among other things on the pressure drop $P_{gas\_in}-P_{gas\_out}$. The gas inflow can therefore be determined on the basis of $\varphi_3$.

For calculating the gas flow through gas line 6 on the basis of $\varphi_3$ use is optionally made of calibration data and/or data about the sensor characteristic.

Instead of a mass flow sensor 18 with three temperature sensors 22, 24, 26 it is alternatively possible to use a conventional mass flow sensor 18' (FIG. 3A) with two temperature sensors 22', 24' and a heating element 20'. In similar manner as described above, control valve 12 is controlled on the basis of a difference in the temperature measured by sensor 22' and sensor 24'. This temperature difference is a measure of $\varphi_1-\varphi_2$. The total flow rate of the gas flow $\varphi_3$ can be determined on the basis of the temperature measured by sensor 22' and/or sensor 24'. This is because heating element 20' heats the gas with a constant power. If the gas flow $\varphi_3$ increases, the temperature measured by $\varphi_1$ and $\varphi_2$ will decrease. Because the gas flow is controlled such that $\varphi_1=\varphi_2$, it is the case that $\varphi_3=2^*\varphi_1=2^*\varphi_2$. Expressed as a function of temperature of sensors 22' and 24', this results in $\varphi_3=R^*2^*T_{22'}=R^*2^*T_{24'}$, wherein R is a constant which depends among other things on the constant, predetermined power of heating element 20'. $\varphi_3$ is preferably determined on the basis of the sum of the temperatures measured by the sensors, as according to $\varphi_3=R^*(T_{22'}+T_{24'})$, so that the determined flow rate $|\varphi_3|$ is less susceptible to measuring inaccuracies.

In a further variant the mass flow sensor 1018 (FIG. 3B) is embodied without a separate heating element. Two temperature sensors 1022, 1024 are each incorporated in an electric circuit. Because a current runs through the temperature sensors, they produce heat. This heat changes the resistance of temperature sensors 1022, 1024. Positive Temperature Coefficient (PTC) thermistors are preferably applied as temperature sensors 1022, 1024. The heating of the sensors 1022, 1024 then results in an increase in the resistance. Negative Temperature Coefficient (NTC) thermistors can alternatively be applied, wherein the heating results in a decrease in the resistance. In a further alternative a hot wire is applied as temperature sensor, in similar manner as a PTC thermistor.

The self-heating of temperature sensors 1022, 1024 is influenced by the passing gas. Temperature sensors 1022, 1024 are in particular cooled by the passing gas. The degree of cooling depends on the mass flow rate of the gas flow: the more gas flows past sensors 1022, 1024 per unit of time, the more sensors 1022, 1024 are cooled. In short, the gas flow influences the temperature of sensors 1022, 1024 and thereby the resistance, which resistance can be measured. For this measurement the sensors 1022, 1024 are incorporated in a measuring circuit. The circuit is for instance configured to apply a constant voltage over the relevant sensor 1022, 1024. The gas flow cools sensor 1022, 1024 so that its resistance decreases (PTC) or increases (NTC), which provides for respectively an increase or decrease of the current when the voltage remains constant. The current is measured and is a measure of the mass flow rate. The output of the circuit is for instance a voltage indicative of the current through sensor 1022, 1024 and thereby of the respective mass flow rate $|\varphi_1|$ or $|\varphi_2|$ in question.

It is noted that, although the mass flow rate $|\varphi|$ of the relevant gas flow can be measured with sensors 1022, 1024, the direction of this gas flow cannot. The direction is however fixed because of the chosen configuration of the second measuring line.

In another example a sensor 1022, 1024 is incorporated in a circuit configured to maintain a constant current through sensor 1022, 1024. In such a circuit the voltage over sensor 1022, 1024 is a measure of the mass flow rate of the gas flow.

A circuit which is configured to keep the temperature of sensor 1022, 1024 constant is however preferably applied. An example of such a circuit is shown in FIG. 3C. The circuit comprises an amplifier, such as an op-amp, with a negative input and a positive input. The circuit further comprises a Wheatstone bridge in which a PTC thermistor $R_{ptc}$ is incorporated in the shown example. Point A of the Wheatstone bridge is connected to the negative input of the amplifier, while point B is connected to the positive input. If the temperature of $R_{ptc}$ drops because gas flows past this sensor, its resistance will decrease. The amplifier will however maintain equal voltage at its two inputs, so that $V_+ = V_-$ and $V_A = V_B$. When the resistance decreases, the amplifier will thus inject more power into point C of the Wheatstone bridge, whereby the output voltage $V_{out}$ also increases. $V_{out}$ is therefore a measure of the mass flow rate of the gas flow: a higher mass flow rate means a higher voltage $V_{out}$.

FIG. 3D shows a variant of FIG. 3B wherein mass flow sensor 1018' is embodied with three temperature sensors 1022, 1024, 1026. A mass flow rate of the relevant flow can be determined with each temperature sensor 1022, 1024, 1026 in similar manner as described above for mass flow sensor 1018. In short, a measuring circuit with sensor 1022 produces an output indicative of $|\varphi_1|$, a measuring circuit with sensor 1024 an output indicative of $|\varphi_2|$ and a measuring circuit with sensor 1026 an output indicative of $|\varphi_3|$.

In a device 102 according to a second exemplary embodiment (FIG. 4) the second measuring line 116 is situated downstream relative to the first measuring line 114. In other words, the outer end d of measuring line 116 is situated downstream relative to outer end b of measuring line 114, as seen in the direction of flow through gas line 106. The sensor will likewise be mirrored relative to FIG. 1B, i.e. with temperature sensor 26 on the opposite side of heating element 20 (to the right instead of to the left of element 20 in FIG. 1B). Because of this alternative configuration the direction of flow of $\varphi_1$, $\varphi_2$ and $\varphi_3$ is opposite to the corresponding flows in FIG. 1A. It is however likewise the case for device 102 that: $\varphi_3 = \varphi_1 + \varphi_2$ (with the flow directions defined as in FIG. 4).

Control valve 112 of device 102 is controlled such that $P_{gas\_in} = P_{air}$. In that case $\varphi_1 = \varphi_2$. In short, just as with device 102, the controller (not shown) controls control valve 112 on the basis of the difference between $\varphi_1$ and $\varphi_2$. This difference can be determined on the basis of the temperature measured by sensors 22 and 24, as according to $\varphi_1 - \varphi_2 = C^*(T_{24} - T_{22})$. In short, if sensors 22 and 24 measure the same temperature, then it is the case that $\varphi_1 = \varphi_2$.

In device 102 fan 108 is placed upstream of measuring line 114 in the direction of flow of the air, instead of downstream of measuring line 14, as in FIG. 1A. It is noted that this is optional: a fan can be placed upstream or downstream of the first measuring line as desired in any embodiment of the device according to the invention.

In a third embodiment device 202 has a configuration for measuring the flow rate of the supplied air instead of the flow rate of the indrawn gas (FIG. 5). In this case the second measuring line 216 is connected to air line 204 instead of to the gas line. In air line 204 a flow restriction 219 is provided between the outer end d of measuring line 216 and the outer end a of measuring line 214. For purposes of comparison, in FIG. 1A the flow restriction was situated in the gas line. It is once again the case that $\varphi_3 = \varphi_1 + \varphi_2$. In the embodiment according to FIG. 5 $\varphi_3$ is however a measure of the indrawn air flow instead of the indrawn gas flow. In this case $\varphi_3$ depends among other things on the pressure difference $P_{air\_in} - P_{air\_out}$. In other words, $|\varphi_3|$ is a measure of the flow rate of the air flow.

Device 302 according to a fourth embodiment (FIG. 6) has a second measuring line 316 which, just as in the embodiment according to FIG. 5, is connected to air line 304. In contrast to FIG. 5, measuring line 316 is however situated downstream relative to measuring line 314. In this situation $|\varphi_3|$ is also a measure of the flow rate of the air flow.

In a fifth embodiment (FIG. 7) the second measuring line 416 is connected with its second outer end d to both air line 404 and gas line 406 in that lines 404, 406 and 416 converge in mixing chamber 428. No fan is shown in this example, but the device comprises a fan downstream which draws in the mixture as according to arrow Z as a result of an underpressure $P_Z$ being realized relative to $P_{air}$ and $P_{gas}$.

A flow restriction 419a is provided in the air line 404 downstream of the first measuring line 414. A flow restriction 419b is provided in gas line 406 downstream of the first measuring line 414.

In the fifth embodiment $\varphi_3 = \varphi_1 + \varphi_2$ is a measure of the total flow of the gas-air mixture in the direction of the burner. Control valve 412 is once again controlled on the basis of $\varphi_1 - \varphi_2$, as determined by means of mass flow sensor 418. This achieves that $\varphi_1 = \varphi_2$ and, as a result, $P_{air} = P_{gas}$.

In a sixth embodiment (FIG. 8) the gas line is provided with a shut-off valve 530 upstream relative to control valve 512. It is noted that a shut-off valve is preferably also provided upstream of control valve 512 in the above described embodiments.

Device 502 according to the sixth embodiment comprises a second measuring line 516 which is connected to gas line 506 at a point upstream of control valve 512. In the shown embodiment with optional shut-off valve 530 outer end d of measuring line 516 is situated between control valve 512 and shut-off valve 530. In the configuration according to FIG. 8 the flow $\varphi_3$ therefore depends on the pressure difference $P_{gas\_supply} - P_{gas}$. $\varphi_3$ thereby forms a measure of this pressure difference. In the same way as described above, control valve 512 is controlled so that $\varphi_1 = \varphi_2$ and thus $P_{air} = P_{gas}$.

Device 502 comprises in the shown embodiment an optional flow restriction 519 in air line 504, downstream of the first measuring line 514.

In devices 102, 202, 302, 402 and 502 it is likewise possible to apply sensor 18', 1018 or 1018' of FIG. 3A, 3B or 3D instead of sensor 18, 118.

For the purpose of measuring the mass flow rate of the various gas flows the thermal mass flow sensor according to the invention optionally comprises more than three temperature sensors and/or more than one heating element. FIG. 9A shows a sensor 618 in which two temperature sensors 622, 624 are provided on either side of heating element 620, wherein temperature sensors 622, 624 are arranged substantially in one line with heating element 620. This is similar to the embodiment according to FIG. 1B. Sensor 618 however comprises two sensors 626a, 626b instead of one sensor 26. These temperature sensors 626a, 626b are arranged at substantially the same distance from heating element 620. The mass flow rate of flow $\varphi_1$ can now be determined on the basis of the temperature measured by sensors 622, 626a and 626b.

By providing two temperature sensors 626a, 626b the accuracy of the determination of the mass flow rate of flows $\varphi_1$ and $\varphi_2$ is increased.

On the basis of a substantially linear relation, $\varphi_1$ is for instance calculated as follows: $\varphi_1 = V*(T_{622} - 0.5*T_{626a} - 0.5*T_{626b})$, wherein V is a constant. In short, the average value of sensors 626a and 626b is used as temperature upstream of element 620 and the temperature of sensor 622 is used as temperature downstream of element 620.

In a further embodiment (FIG. 9B) sensor 718 comprises two heating elements 720a and 720b. Two temperature sensors 722a, 722b are provided on a first side, while two temperature sensors 724a, 724b are also provided on an opposite side. The sensors 722a, 722b, 724a, 724b are configured to measure the flow rate of a gas flow in a first direction. Provided on another side of heating elements 720a, 720b are three temperature sensors 726a, 726b, 726c which are configured to measure the flow rate of a gas flow in a second direction lying substantially perpendicularly of the first direction.

Heating elements 720a, 720b are supplied with a predetermined, constant power, so that the heat production is constant. Sensors 722a and 722b measure the heating up as a result of flow $\varphi_1$. Sensors 724a, 724b measure the heating up as a result of flow $\varphi_2$. Sensors 726a, 726b, 726c measure the cooling as a result of flow $\varphi_3$. By always providing more than one sensor the accuracy of the temperature measurement is increased. The accuracy of the determined mass flow rate is therefore increased.

In a further embodiment (FIG. 9C) a thermal mass flow sensor 818 is provided as a matrix sensor of heating elements H and temperature sensors R. In the example of FIG. 9C the components are arranged in a grid, wherein nine sensors R are placed around each heating element H.

An alternative arrangement of sensors R and heating elements H is however likewise possible, as illustrated with thermal mass flow sensor 918 in FIG. 9D. In this example temperature sensors R and heating elements H are arranged in a checkerboard pattern.

The matrix sensor is for instance embodied as a thin film sensor. The matrix sensor is for instance produced by applying a thin film to a substrate. The substrate is for instance of a material with low thermal conductivity, for instance a ceramic material. An electronic structure is then arranged on the thin film, wherein the measuring resistors and the heating resistors are formed. This can for instance be realized by etching of the thin film layer, or another known technology for chip production.

The matrix sensor according to the invention can be applied not only in a device for mixing gas and air, but can also be used in other applications. The matrix sensor can for instance be applied in order to determine the flow profile in a conduit. The matrix sensor can be applied for the purpose of both measuring a gas flow and measuring a liquid flow.

The present invention is by no means limited to the above described preferred embodiments thereof. The rights sought are defined by the following claims, within the scope of which many modifications can be envisaged.

The invention claimed is:

1. A device for mixing a combustible gas and combustion air for supplying to a burner, comprising:
   an air line for the supply of combustion air;
   a gas line for the supply of a combustible gas which is provided with a control valve;
   a first measuring line with a first outer end which is connected to the air line and a second outer end which is connected to the gas line;
   a second measuring line with a first outer end which is connected to the first measuring line at a point between the first and second outer ends of the first measuring line, thus forming a three-way intersection, and with a second outer end which is connected to the gas line and/or the air line;
   a thermal mass flow sensor, comprising:
      a first temperature sensor arranged in the first measuring line and positioned such that it is situated in a gas flow between the three-way intersection and the air line during use; and
      a second temperature sensor arranged in the first measuring line and positioned such that it is situated in a gas flow between the three-way intersection and the gas line during use;
   a controller connected to the thermal mass flow sensor and the control valve and configured to control the control valve on the basis of a difference, measured by the thermal mass flow sensor, between the mass flow rate of the gas flow between the three-way intersection and the air line and the mass flow rate of the gas flow between the three-way intersection and the gas line.

2. The device as claimed in claim 1, wherein the first temperature sensor and second temperature sensor are each provided in a circuit for constant temperature anemometry.

3. The device as claimed in claim 1, wherein the thermal mass flow sensor further comprises a heating element arranged in the first measuring line and is situated at or close to the three-way intersection, wherein the first temperature sensor is situated upstream of the heating element and the second temperature sensor is situated downstream of the heating element, as seen in a direction from the air line to the gas line, wherein the controller is configured to control the control valve on the basis of a difference between the temperature measured by the first temperature sensor and the temperature measured by the second temperature sensor.

4. The device as claimed in claim 3, wherein the thermal mass flow sensor comprises a third temperature sensor situated on a side of the heating element facing toward the second measuring line, and wherein the processing unit is configured to determine the mass flow rate through the second measuring line on the basis of the values output by the first, second and third temperature sensors.

5. The device as claimed in claim 1, further comprising a processing unit which is operatively connected to the thermal mass flow sensor and is configured to determine a mass flow rate through the second measuring line on the basis of the values output by the first temperature sensor and the second temperature sensor.

6. The device as claimed in claim 1, wherein the second outer end of the second measuring line is connected to the gas line at a point situated upstream relative to the point at which the first measuring line is connected to the gas line, as seen in the direction of flow of the combustible gas through the gas line.

7. The device as claimed in claim 6, wherein the gas line comprises a flow restriction between the point at which the first measuring line is connected to the gas line and the point at which the second measuring line is connected to the gas line.

8. The device as claimed in claim 1, wherein the second outer end of the second measuring line is connected to the gas line at a point situated downstream relative to the point at which the first measuring line is connected to the gas line, as seen in the direction of flow of the combustible gas through the gas line.

9. The device as claimed in claim 1, wherein the second outer end of the second measuring line is connected to the air line at a point situated upstream relative to the point at which the first measuring line is connected to the air line, as seen in the direction of flow of the combustion air through the air line.

10. The device as claimed in claim 9, wherein the air line comprises a flow restriction between the point at which the first measuring line is connected to the air line and the point at which the second measuring line is connected to the air line.

11. The device as claimed in claim 1, wherein the second outer end of the second measuring line is connected to the air line at a point situated downstream relative to the point at which the first measuring line is connected to the air line, as seen in the direction of flow of the combustion air through the air line.

12. The device as claimed in claim 1, wherein the second outer end of the second measuring line is connected to both the gas line and the air line, downstream of the point at which the first measuring line is connected to the air line and downstream of the point at which the first measuring line is connected to the gas line.

13. The device as claimed in claim 12, wherein the air line comprises a first flow restriction situated downstream of the point at which the air line is connected to the first measuring line, as seen in the direction of flow of combustion air through the air line, and wherein the gas line comprises a second flow restriction situated downstream of the point at which the gas line is connected to the first measuring line, as seen in the direction of flow of combustible gas through the gas line.

14. The device as claimed in claim 1, wherein the gas line comprises a shut-off valve upstream of the control valve, and the second outer end of the second measuring line is connected to the gas line at a point situated between the control valve and the shut-off valve.

15. A hot water installation comprising the device as claimed in claim 1.

16. A thermal mass flow sensor, comprising:
a heating element; and
a first, a second and a third temperature sensor,
wherein the first and second temperature sensors are arranged on either side of the heating element and are arranged in one line with the heating element in a first direction, and wherein the third temperature sensor is arranged in one line with the heating element in a second direction, which differs from the first direction that lies substantially transversely of the second direction.

17. The thermal mass flow sensor as claimed in claim 16, comprising at least two temperature sensors arranged adjacently of each other on the same side of the heating element and at substantially the same distance from the heating element.

18. The thermal mass flow sensor as claimed in claim 16, wherein the heating element and the temperature sensors are arranged in a grid.

19. A method for controlling a device for mixing a combustible gas and combustion air for supplying to a burner, the device comprising:
an air line for the supply of combustion air;
a gas line for the supply of a combustible gas provided with a control valve;
a first measuring line with a first outer end which is connected to the air line and a second outer end which is connected to the gas line; and
a second measuring line with a first outer end which is connected to the first measuring line at a point between the first and second outer end of the first measuring line, thus forming a three-way intersection, and with a second outer end which is connected to the gas line and/or the air line,
the method comprising:
measuring a mass flow rate of a gas flow between the three-way intersection and the air line;
measuring a mass flow rate of a gas flow between the three-way intersection and the gas line;
opening the control valve if the mass flow rate of the gas flow between the three-way intersection and the gas line is a predetermined first threshold value smaller than the gas flow between the three-way intersection and the air line; and
closing the control valve if the mass flow rate of the gas flow between the three-way intersection and the gas line is a predetermined second threshold value greater than the gas flow between the three-way intersection and the air line.

20. A method for measuring a mass flow rate of a gas flow in a device for mixing combustible gas and combustion air for supplying to a burner, the device comprising:
an air line for the supply of combustion air;
a gas line for the supply of combustible gas provided with a control valve;
a first measuring line with a first outer end which is connected to the air line and a second outer end which is connected to the gas line;
a second measuring line with a first outer end which is connected to the first measuring line at a point between the first and second outer end of the first measuring line, thus forming a three-way intersection, and with a second outer end which is connected to the gas line and/or the air line;
a thermal mass flow sensor, comprising:
a first temperature sensor arranged in the first measuring line and positioned such that it is situated in a gas flow between the three-way intersection and the air line during use; and
a second temperature sensor arranged in the first measuring line and positioned such that it is situated in a gas flow between the three-way intersection and the gas line during use,
the method comprising:
determining the mass flow rate through the second measuring line on the basis of the value output by the first temperature sensor and the value output by the second temperature sensor.

* * * * *